(12) United States Patent
Keen

(10) Patent No.: US 6,487,754 B1
(45) Date of Patent: Dec. 3, 2002

(54) SPRING LOADED HOOD SUPPORT

(75) Inventor: Eric Albert Keen, Waterloo, IA (US)

(73) Assignee: Deere & Company, Moline, IL (US)

( * ) Notice: Subject to any disclaimer, the term of this patent is extended or adjusted under 35 U.S.C. 154(b) by 55 days.

(21) Appl. No.: 09/661,857

(22) Filed: Sep. 14, 2000

(51) Int. Cl.$^7$ ............................................. B62D 25/10
(52) U.S. Cl. ...................... 16/306; 16/289; 180/69.21; 296/100.1; 49/386
(58) Field of Search .......................... 16/306, 302, 287, 16/288, 289, 291; 49/386, 387; 296/100.08, 100.09, 100.1, 76; 180/69.2, 69.21

(56) References Cited

U.S. PATENT DOCUMENTS

| | | | | |
|---|---|---|---|---|
| 2,322,630 A | * | 6/1943 | Greig | 180/69.21 |
| 2,737,254 A | * | 3/1956 | Bayley | 180/69.21 |
| 3,815,176 A | * | 6/1974 | Porter | 16/288 |
| 4,819,981 A | * | 4/1989 | Moe et al. | 296/100.1 |
| 5,136,752 A | * | 8/1992 | Bening et al. | 16/287 |
| 5,339,494 A | | 8/1994 | Esau et al. | |
| 5,535,846 A | | 7/1996 | Kurtz, Jr. et al. | |
| 5,564,514 A | | 10/1996 | Knight | |
| 5,645,133 A | | 7/1997 | Thompson et al. | |
| 5,803,198 A | | 9/1998 | Baxter et al. | |
| 6,213,235 B1 | * | 4/2001 | Elhardt et al. | 180/69.2 |

* cited by examiner

Primary Examiner—Lynne H. Browne
Assistant Examiner—Doug Hutton

(57) ABSTRACT

A support mechanism supports a hood in a raised position with respect to a vehicle to which the hood is pivotally coupled. The support mechanism includes a pivotal lift rod coupled between the vehicle and the hood. The mechanism also includes a pair of arm members which are pivotally coupled to each other by a central pivot pin, and which are coupled between the vehicle and a central portion of the rod. A flat coil spring is coiled around the central pivot pin and is attached to the arm members. The spring is biased to pivot the hood upwardly. The lower end of the rod is anchored by a removable pivot pin, which, when removed, permits the hood to be raised approximately 90 degrees from it lowered position.

5 Claims, 4 Drawing Sheets

SPRING LOADED HOOD SUPPORT

BACKGROUND OF THE INVENTION

This invention relates to a support mechanism for a hood which covers a vehicle engine and other components of a vehicle, such as an agricultural or industrial vehicle.

It is known practice to use gas springs to support the hood of a vehicle, such as an agricultural tractor. However, gas springs are prone to failure as they wear out or lose their gas charge, and their force is variable as the temperature varies. Some known hood supports require a safety catch or a separate prop rod to hold a hood in a raised position. Accordingly, it would be desirable to have a hood support mechanism which avoids the use of gas springs, and which does not require a safety catch or a prop rod.

SUMMARY OF THE INVENTION

An object of the present invention is to provide a hood support mechanism.

Another object is to provide such a hood support mechanism which avoids the use of gas springs.

Another object is to provide such a hood support mechanism which has a long life and which eliminates the need for a safety catch or separate prop rod.

These and other objects are achieved by this invention wherein a support mechanism supports a hood in a raised position with respect to a vehicle to which the hood is pivotally coupled. The support mechanism includes a pivotal lift rod coupled between the vehicle and the hood. The mechanism also includes a pair of arm members which are pivotally coupled to each other by a central pivot pin, and which are coupled between the vehicle and a central portion of the rod. A flat coil spring is coiled around the central pivot pin and is attached to the arm members. The spring is biased to pivot the hood upwardly. The lower end of the rod is anchored by a removable pivot pin, which, when removed, permits the hood to be raised approximately 90 degrees from it lowered position. With this support mechanism there is no gas spring, the coil spring has a long life and no safety catch or separate prop rod is required.

DESCRIPTION OF THE PREFERRED EMBODIMENT

Figure 1:
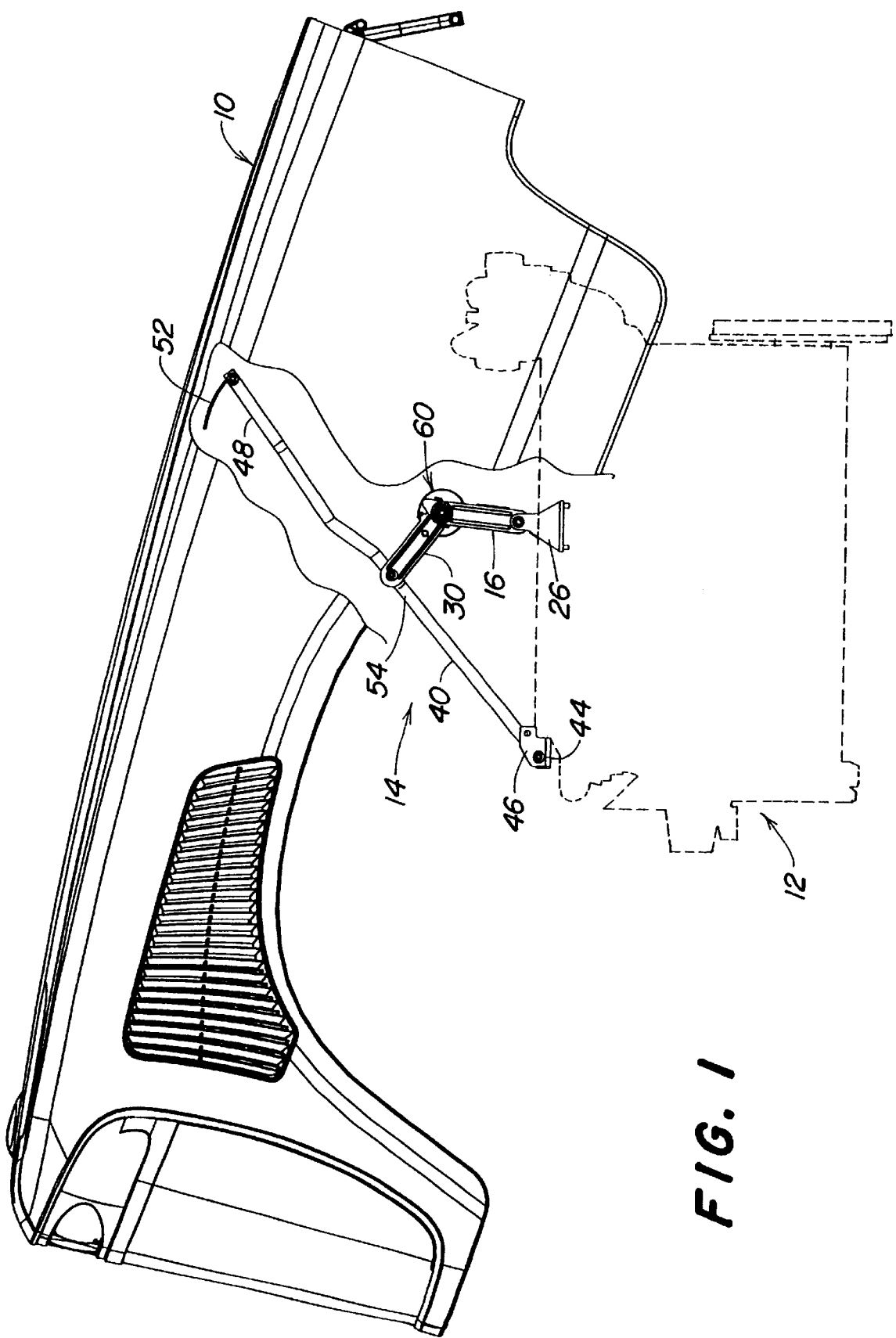
FIG. 1 is a side view of an agricultural tractor hood in a raised position and with a hood support mechanism according to the invention.
Figure 2:
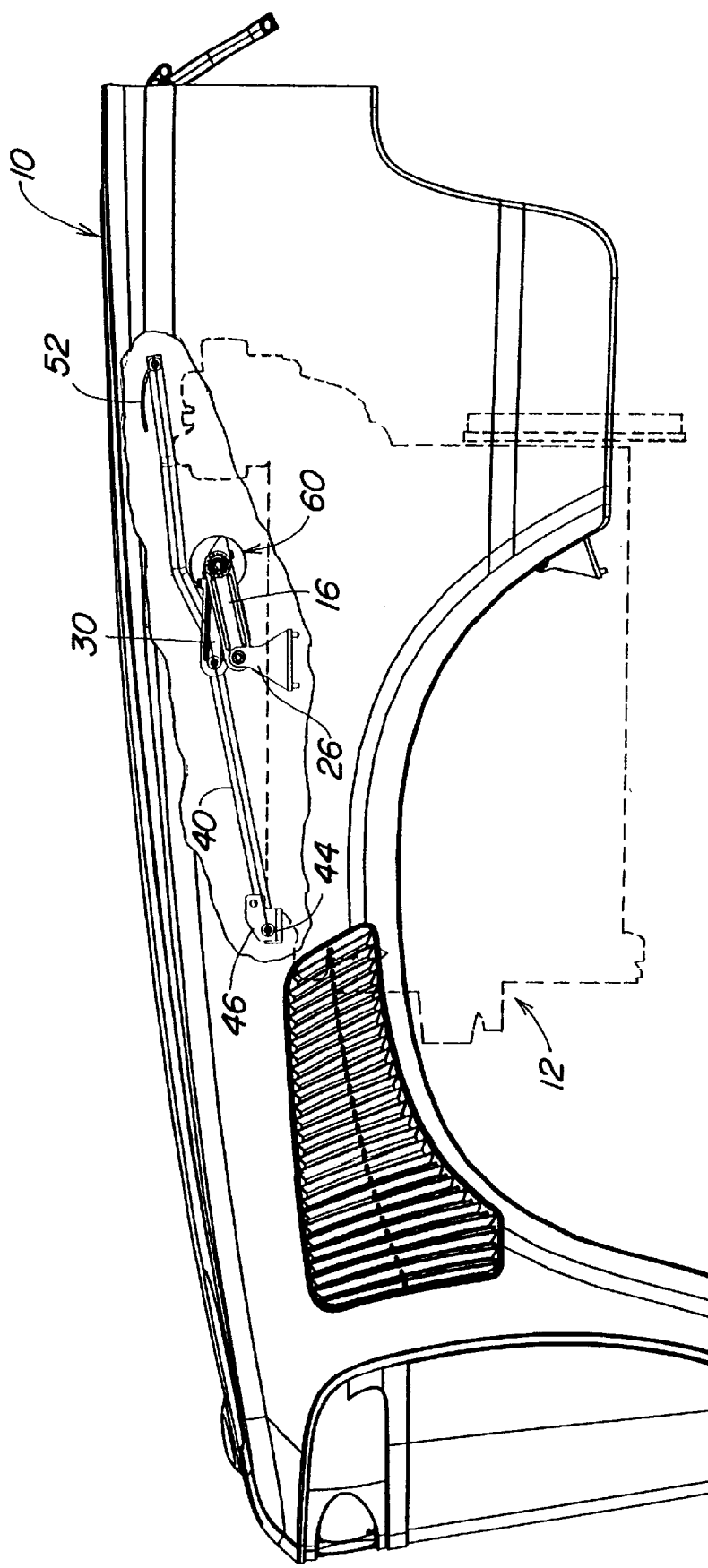
FIG. 2 is a side view similar to FIG. 1, but with the hood in a lowered position.
Figure 3:
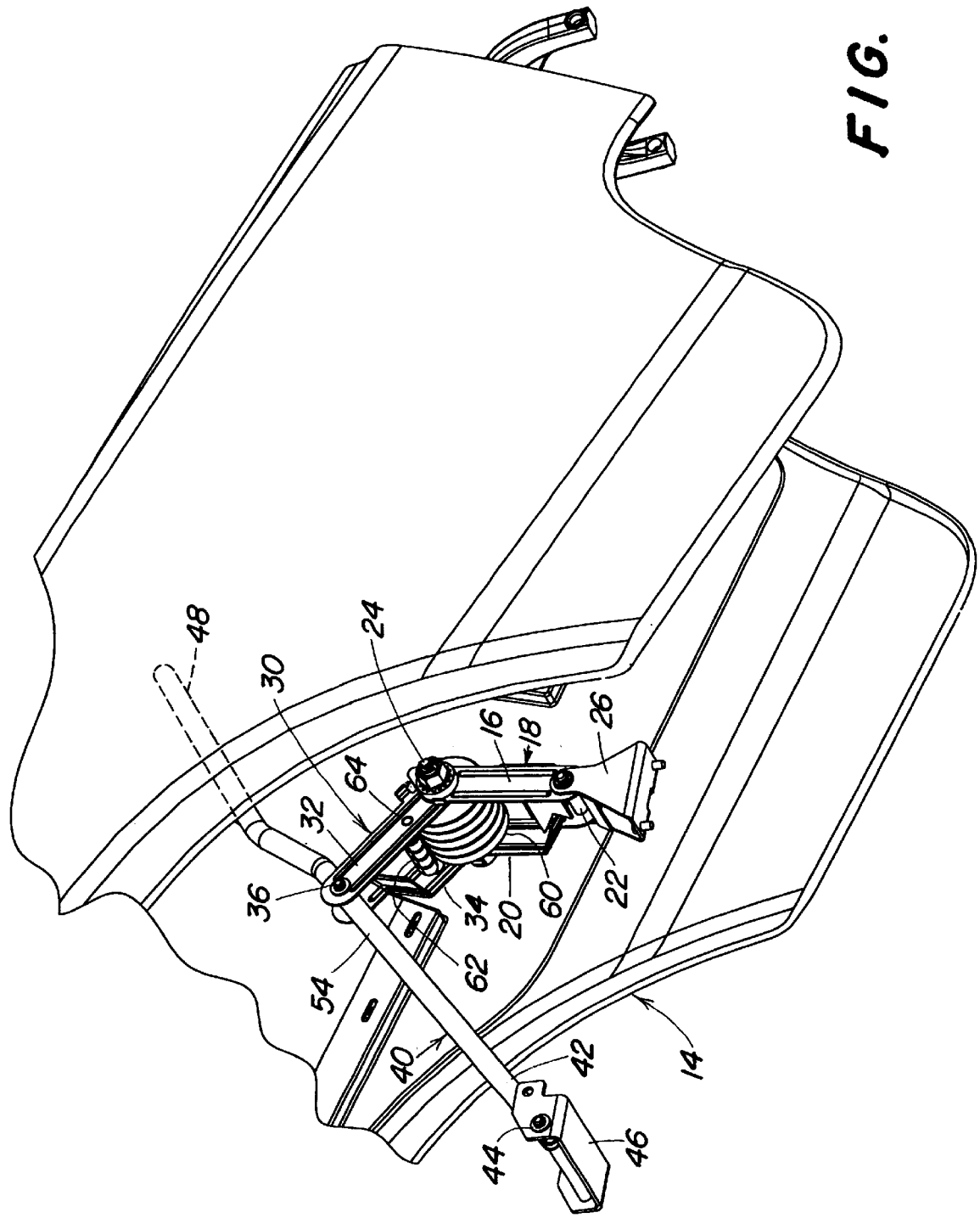
FIG. 3 is perspective enlarged view of the hood support mechanism of FIGS. 1 and 2.
Figure 4:
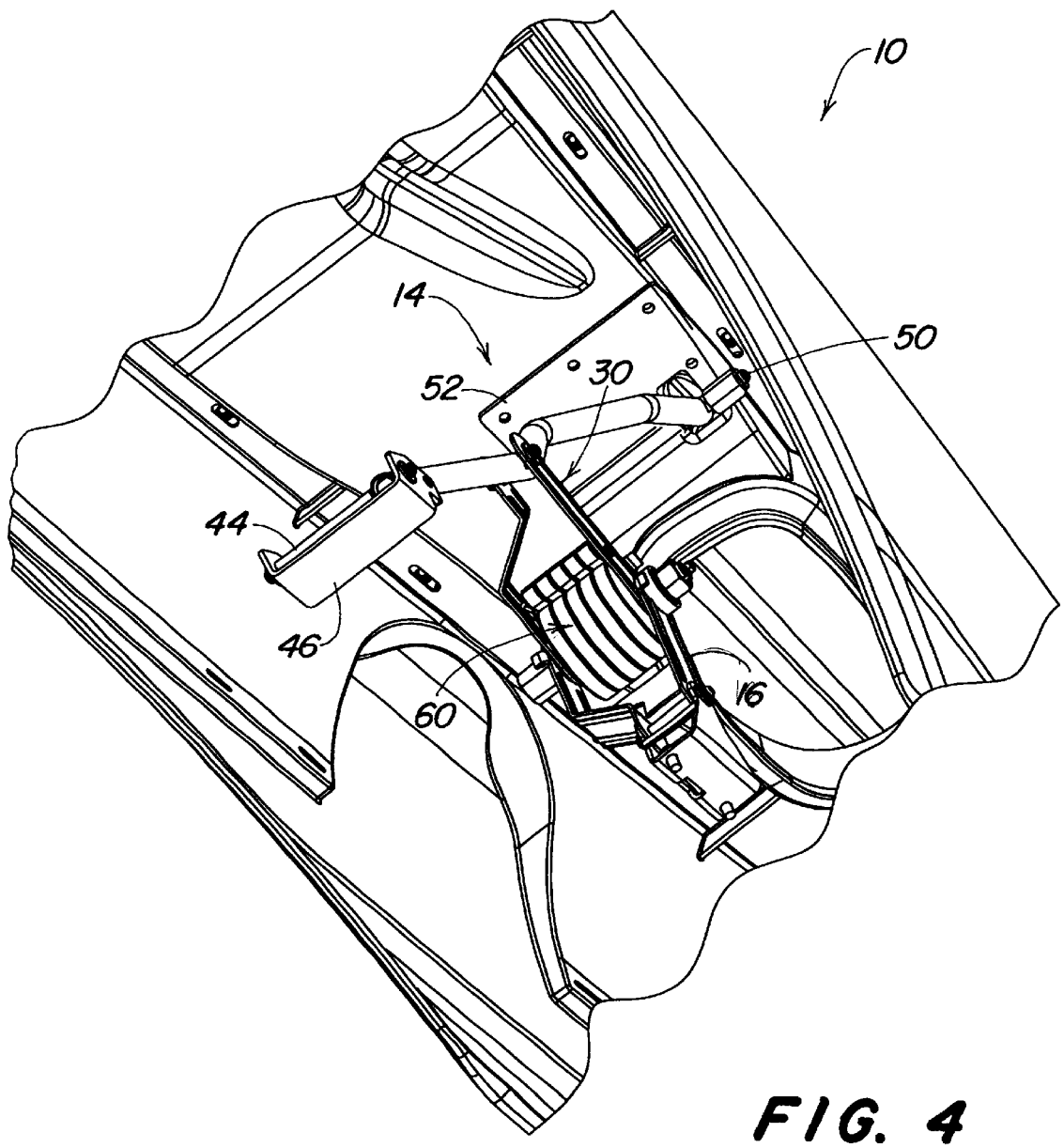
FIG. 4 is an enlarged perspective detailed upward view of the hinge support mechanism from below.

As seen in FIGS. 1–4, a hood 10 is supported at its rear end by a hinge assembly (not shown) with respect to an engine 12 of an agricultural tractor (not shown). The hood 10 may be held in a raised position by a support mechanism 14. Support mechanism 14 includes a first arm 16 having spaced-apart arm members 18 and 20 having a lower ends joined together by a lower pivot pin 22 and upper ends attached to a center pivot pin 24. Pin 22 is pivotally received by a bracket 26 which fixed to an upper central portion of the engine 12. Support mechanism 14 also includes a second arm 30 having spaced-apart arm members 32 and 34 having a lower ends pivotally receiving pin 24 and having upper ends joined together by upper pivot pin 36. Preferably, the center pivot pin 24 is non-rotatably fixed to one of the arms 16 or 30, such as first arm 16.

Support mechanism 14 also includes a lift rod 40 having a first end 42 pivotally coupled by a pivot pin 44 to a bracket 46 which is fixed to an upper forward portion of the engine 12. Rod 40 also has a second end 45 which is pivotally coupled by a pivot pin 50 to a bracket 52 which is bolted to the underside of the hood 10. A central portion 54 of the rod 40 is pivotally coupled to the end of the second arm 30 via pivot pin 36. Pin 44 can be removed from bracket 46 to free end 42 of rod 40 and to thereby permit the hood 16 to be raised beyond to what is shown in FIG. 1, to a position (not shown) wherein the hood 16 is pivoted approximately 90 degrees from the lowered position of FIG. 2.

A resilient member or spring 60 is coupled between the first arm 16 and the second 16, and thus to raise the hood 16. Preferably, the resilient member 60 is a torsion spring which is coiled around the pivot pin 24. Spring 60 has an outer end 62 which is anchored with respect to arm 30 by a pin 64 which extends between a mid-portion of arm members 32 and 34. An inner end (not shown) of spring 60 is anchored to center pivot pin 24. Spring 60 is biased to pivot arm 30 upwardly, clockwise, viewing the Figures, and towards the hood 16, and thus tending to raise the hood 15 and hold the hood in a raised position, such as shown in FIG. 1. Spring 60 also permits the hood 16 to be lowered in to the lowered position shown in FIG. 2. The strength of spring 60 varies little as the temperature changes, and is selected so that it is sufficient to hold the hood 10 in its raised position and so that no additional safety catch or prop rod is required.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A support mechanism for supporting a hood with respect to a vehicle to which the hood is pivotally coupled, the support mechanism comprising:

a first arm having a first end pivotally coupled to the vehicle and having a second end;

a second arm having a first end pivotally coupled to the second end of the first arm, and having a second end;

a lift rod having a first end pivotally coupled to the vehicle, having a second end for engaging and supporting the hood, and having a central portion pivotally coupled to the second end of the second arm;

a resilient member coupled between the first and second arms and biased to urge the second end of the second arm upwardly and towards the hood.

2. The support mechanism of claim 1, wherein:

a pivot pin couples the second arm to the first arm, the resilient member being coiled around the pivot pin.

3. The support mechanism of claim 1, wherein:

a pivot pin couples the second arm to the first arm, the pivot pin being non-rotatably attached to one of the arms, the resilient member being coiled around the pivot pin, the resilient member having an inner end anchored to the pivot pin and having an outer end anchored to the other of the arms.

4. The support mechanism of claim 1, wherein:

a pivot pin couples the second arm to the first arm, the pivot pin being non-rotatably attached to the first arm, the resilient member being coiled around the pivot pin, the resilient member having an inner end anchored to the pivot pin and having an outer end anchored to the second arm.

5. The support mechanism of claim 1, wherein:

the first end of the lift rod is coupled to a bracket by a removable pivot pin which is removably received by bores in the first end of the rod and the bracket, said removable pivot pin being removable to permit raising of the hood approximately 90 degrees with respect to a lowered position.

\* \* \* \* \*